(12) United States Patent
Doo et al.

(10) Patent No.: US 9,223,073 B2
(45) Date of Patent: Dec. 29, 2015

(54) LIGHT GUIDE PLATE AND METHOD OF MANUFACTURING THE SAME

(71) Applicant: KOLON INDUSTRIES, INC., Gwacheon-si, Gyeonggi-do (KR)

(72) Inventors: Jun Kil Doo, Yongin-si (KR); Kwan Min Choi, Ansan-si (KR); Tae Gap Jang, Suwon-si (KR); Jae Hun Lee, Suwon-si (KR); Min Jeong Kim, Seoul (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 14/369,789

(22) PCT Filed: Dec. 6, 2012

(86) PCT No.: PCT/KR2012/010543
§ 371 (c)(1),
(2) Date: Jun. 30, 2014

(87) PCT Pub. No.: WO2013/100426
PCT Pub. Date: Jul. 4, 2013

(65) Prior Publication Data
US 2015/0003113 A1 Jan. 1, 2015

(30) Foreign Application Priority Data

Dec. 30, 2011 (KR) .................. 10-2011-0147906

(51) Int. Cl.
*F21V 8/00* (2006.01)

(52) U.S. Cl.
CPC ............ *G02B 6/0011* (2013.01); *G02B 6/0021* (2013.01); *G02B 6/0036* (2013.01); *G02B 6/0065* (2013.01); *G02B 6/0028* (2013.01); *G02B 6/0031* (2013.01); *G02B 6/0068* (2013.01); *G02B 6/0073* (2013.01); *G02B 6/0096* (2013.01); *Y10T 29/49826* (2015.01)

(58) Field of Classification Search
CPC .. G02B 6/0011; G02B 6/0065; G02B 6/0036; G02B 6/0021; G02B 6/0028; G02B 6/0068; G02B 6/0073; G02B 6/0031
See application file for complete search history.

(56) References Cited

U.S. PATENT DOCUMENTS

| 2002/0093832 | A1* | 7/2002 | Hamilton | 362/555 |
| 2007/0086179 | A1* | 4/2007 | Chen et al. | 362/27 |
| 2012/0051093 | A1* | 3/2012 | Kanade et al. | 362/629 |

FOREIGN PATENT DOCUMENTS

| JP | 08-146415 A | 6/1996 |
| JP | 08-320489 A | 12/1996 |
| KR | 10-1998-0015239 A | 5/1998 |
| KR | 10-2002-0071358 A | 9/2002 |
| KR | 10-2007-0040012 A | 4/2007 |
| KR | 10-0997953 B1 | 12/2010 |

OTHER PUBLICATIONS

International Searching Authority, International Search Report of PCT/KR2012/010543 dated Feb. 7, 2013.

* cited by examiner

*Primary Examiner* — Anne Hines
(74) *Attorney, Agent, or Firm* — Sughrue Mion, PLLC

(57) ABSTRACT

This invention relates to a light guide plate, which includes tunnels into which a light source may be inserted in a backlight unit assembly thus reducing light loss, and to a method of manufacturing the same.

6 Claims, 3 Drawing Sheets

LIGHT GUIDE PLATE AND METHOD OF MANUFACTURING THE SAME

TECHNICAL FIELD

The present invention relates to a light guide plate for use in a backlight unit, and to a method of manufacturing the same.

BACKGROUND ART

A liquid crystal display which is used as an optical display device is of an indirect light emission type which shows an image by adjusting transmittance of an external light source, and includes a backlight unit as a light source element which is an important part that determines the characteristics of the liquid crystal display.

A backlight unit (which hereinafter may be abbreviated to "BLU") allows light emitted using a light source such as a cold cathode fluorescent lamp (CCFL) or a light emitting diode (LED) to sequentially pass through a light guide plate or a diffusion plate, a diffusion sheet, and a prism sheet to reach a liquid crystal panel.

As such, the light guide plate is employed in an edge type backlight unit in which a light source is emitted from the side, among two types which are classified depending on the position of the light source in the BLU used as the light emitting element of a liquid crystal display (LCD).

As illustrated in FIG. 1, the edge type backlight unit is configured such that a light source 20 and a light guide plate 10 are spaced apart from each other by a predetermined gap, but is problematic because when light enters the light guide plate from the light source, some of the light leaks out of the light guide plate, undesirably reducing the quantity of light.

In order to solve this problem, a liquid source-light guide plate structure has been developed, in which a groove is formed on the lateral surface of the light guide plate so that the light source is fitted into the groove. Although such a structure may reduce loss of light of a light incidence unit, there occurs comparative light loss due to the absorption of light by the light guide plate itself.

DISCLOSURE

Technical Problem

Accordingly, the present invention is intended to provide a light guide plate, which may reduce loss of light supplied from a light source, and a method of manufacturing the same.

Technical Solution

A preferred first embodiment of the present invention provides a light guide plate having tunnels formed to allow insertion of a light source in a lateral direction, wherein the light guide plate includes a tunnel region having tunnels which are spaced apart from each other and in which the light source is inserted into each of the tunnels, and a tunnel-free region having no tunnels.

In this embodiment, a fine pattern may be formed on a bottom of the light guide plate.

In this embodiment, widths of the tunnel region and the tunnel-free region may be 40~70% and 30~60%, respectively, of an entire width of the light guide plate.

In this embodiment, a height of the tunnels may be 50~90% of a height of the light guide plate.

In this embodiment, the tunnels may have a gap of 3~20 mm therebetween.

Also, a preferred second embodiment of the present invention provides a method of manufacturing the light guide plate, comprising separately extruding a planar lower panel and an upper panel having tunnels, and then combining an upper surface of the lower panel with a lower surface of the upper panel.

In this embodiment, a fine pattern may be formed on the upper surface of the lower panel.

Advantageous Effects

According to the present invention, a light guide plate having tunnels into which a light source can be inserted can be provided, thus reducing light loss which is a problem of a conventional light guide plate. Also, a pattern is formed on the bottom of the tunnels, thus effectively increasing luminance and luminance uniformity.

BEST MODE

Hereinafter, a detailed description will be given of the present invention.

Figure 1:
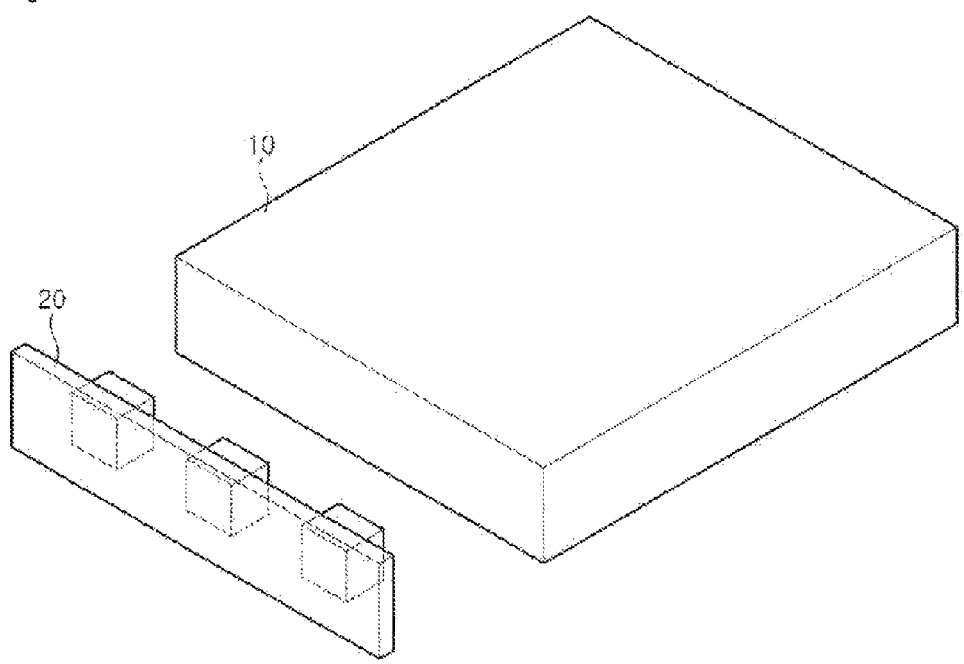
FIG. 1 illustrates a light source and a light guide plate in a conventional backlight unit assembly.
Figure 2:
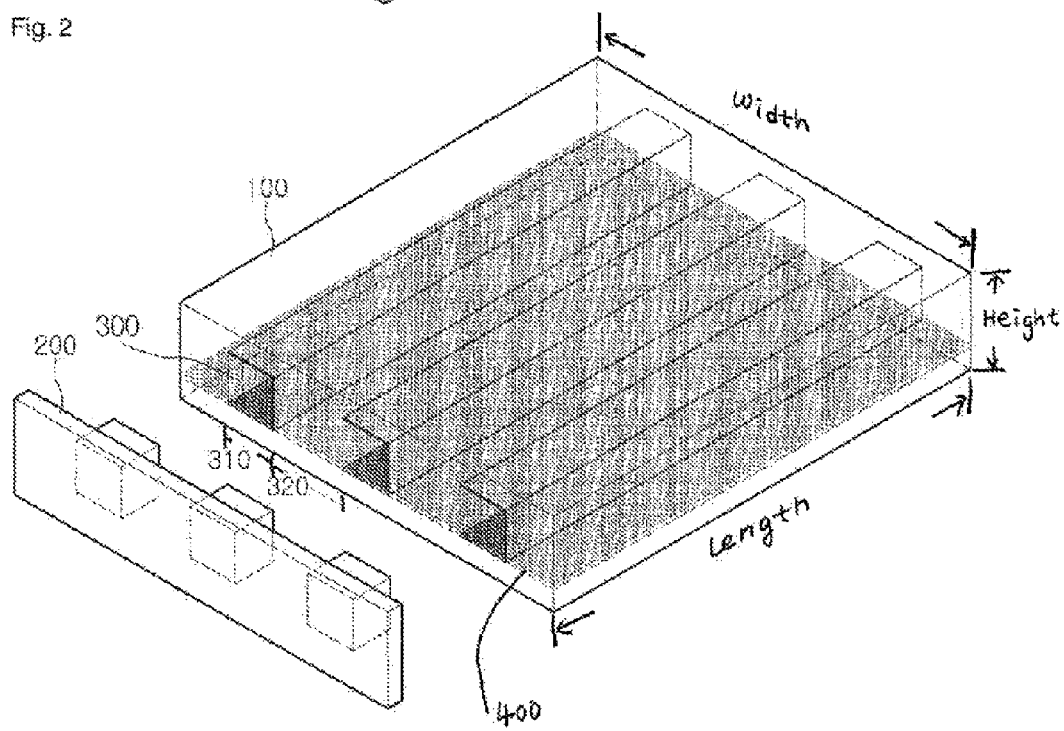
FIG. 2 schematically illustrates a light guide plate according to the present invention.
Figure 3:
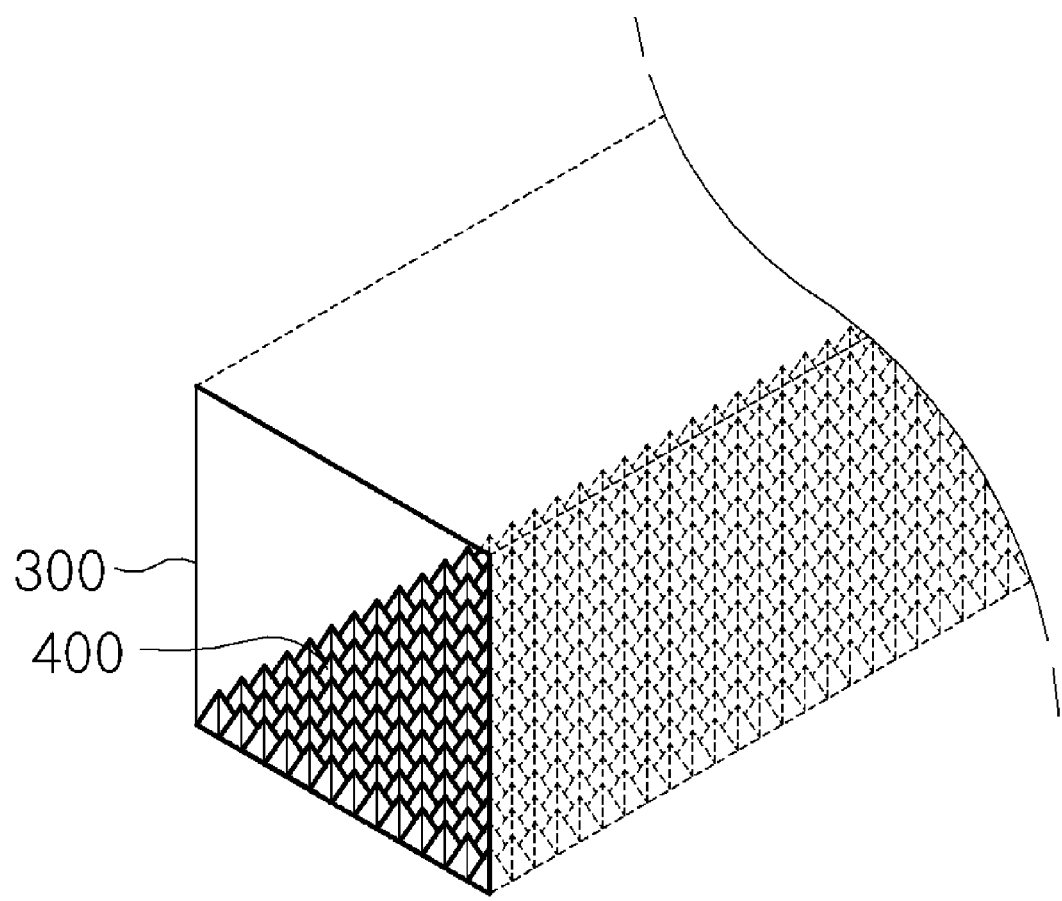
FIG. 3 schematically illustrates a tunnel of the light guide plate according to the present invention.
Figure 4:
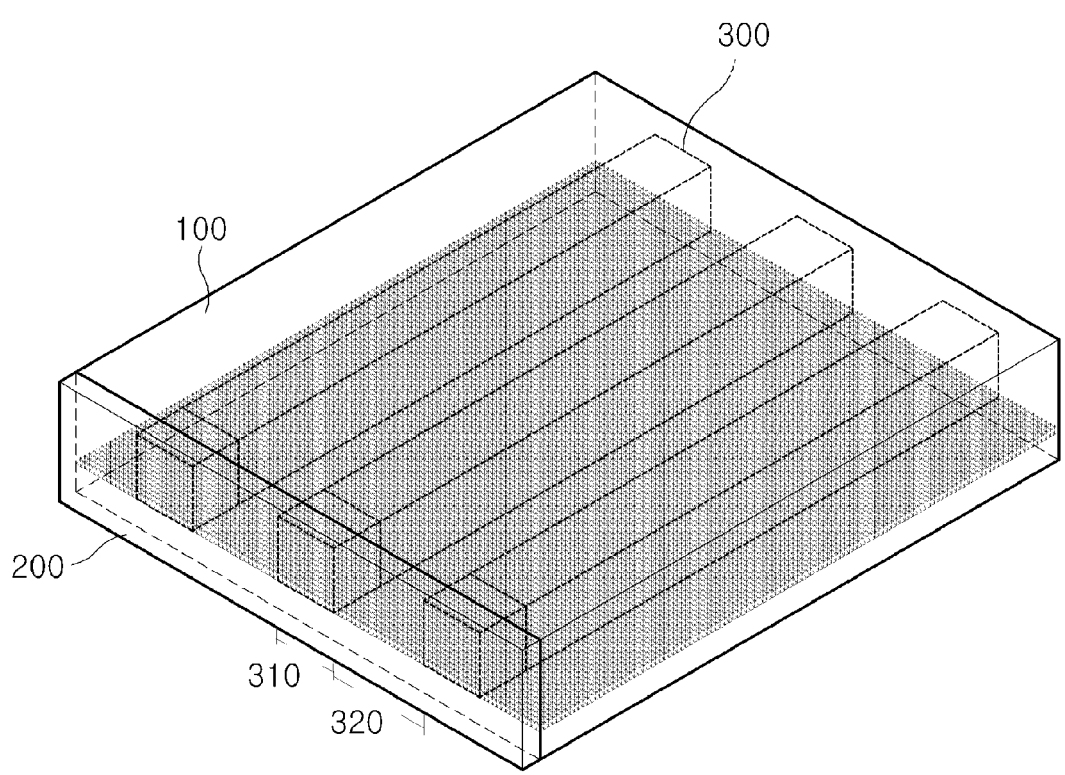
FIG. 4 schematically illustrates the light guide plate according to the present invention into which a light source is inserted.

According to an embodiment of the present invention as exemplified in FIGS. 2-4, a light guide plate 100 having tunnels formed to allow insertion of a light source 200 in a lateral direction includes a tunnel region 310 having tunnels 300 spaced apart from each other and into which the light source is inserted into each of the tunnels, and a tunnel-free region 320 having no tunnels.

The light source is inserted into one open side of each of the tunnels so that light is incident on the light guide plate from the light source, thus reducing light loss which is conventionally caused by the spacing between a light source and a light guide plate when light is incident on the light guide plate from the light source.

Also, a conventional light guide plate, for example, a light guide plate made of a polymethylmethacrylate (PMMA) resin has a light transmittance of about 93%, and the remainder of light, which was not passed therethrough, is absorbed by the light guide plate itself, undesirably causing light loss. However, the light guide plate of the present invention includes tunnels, and thus absorption of light by the light guide plate does not occur by an amount corresponding to the volume of the tunnels, thereby reducing light loss.

Furthermore, as depicted in FIG. 3, a fine pattern 400 is formed on the bottom of the light guide plate, so that light introduced from the light source is uniformly diffused upwards, thus increasing luminance and luminance uniformity. Herein, the bottom of the light guide plate means that, when the light guide plate is configured to include a planar lower panel and an upper panel having tunnels 300, the bottom of the light guide plate indicates the upper surface of the lower panel. That is, the lower panel of the light guide plate, on which a fine pattern 400 is formed over the entire upper surface thereof, and the upper panel having tunnels are combined, thus manufacturing the light guide plate.

The fine pattern may have different density gradients depending on the distance from the light source.

The fine pattern may include any pattern able to cause scattering of light, such as a hemispherical shape, a pyramidal shape, a dot shape, other irregular shapes, etc. In the case of a fine pattern having a hemispherical shape, the diameter thereof may be 20~300 μm.

Such a fine pattern may be formed using extrusion or hot stamping.

In this embodiment, the widths of the tunnel region and the tunnel-free region are 40~70% and 30~60%, respectively, of the entire width of the light guide plate. As such, the width of the tunnel region is the same as the width of the tunnels.

Thus, the width of the tunnels may be 40~70% of the width of the light guide plate. If the width of the tunnels is less than 40%, it is difficult to ensure a significant difference in luminance increment due to short tunnels. In contrast, if the width of the tunnels exceeds 70%, unreliability, that is, warpage at high temperature and high humidity may occur due to an excess of empty space.

Also, the height of the tunnels may be 50~90% of the height of the light guide plate. If the height of the tunnels is less than 50%, linearity of light may become poor due to low quantity of light. In contrast, if the height thereof exceeds 90%, the light guide plate itself may become thick, undesirably causing problems when it combines with other optical members. Herein, the height of the tunnel indicates a distance between the bottom of the tunnel and the top thereof. In the case where a fine pattern is formed, the height of the tunnel means a distance between the bottom surface of the fine pattern (which is the same surface as the bottom of the tunnel when the fine pattern is not formed) and the top of the tunnel.

The light guide plate may be manufactured using extrusion. As a light guide plate having tunnels of double hole type may be manufactured using an extrusion die by a one shot process, price competitiveness and high luminance may be ensured.

Specifically, a planar lower panel and an upper panel having tunnels are separately extruded, after which the upper surface of the lower panel is combined with the lower surface of the upper panel, thus completing the light guide plate. As such, a fine pattern may be formed over the entire upper surface of the lower panel.

In addition, in the case of a backlight unit assembly including such a light guide plate, luminance and luminance uniformity may be improved, and it is possible to obtain a structure in which the light source is inserted into the light guide plate, thus effectively reducing the size of the backlight unit assembly.

The present invention is described below using the following examples, but the present invention is not limited to these examples and may be variously modified by those skilled in the art to which the present invention belongs, within the scope of the present invention.

EXAMPLES 1 to 15 and COMPARATIVE EXAMPLES 1 to 15

A PMMA resin (available from LG MMA) was extruded using a one shot process by means of an extruder (available from OMIPA, Italy) including a die of double hole type, thus manufacturing a PMMA light guide plate having tunnels. As shown in Tables 1, 2 and 3 below, a pattern was formed on the bottom of each of the tunnels of the light guide plate. The light guide plate had a length of 1200 mm in a lateral direction on which a light source is incident, and the height thereof was shown in Table 1 below.

With respect to the light guide plates manufactured in the examples and comparative examples, the luminance and luminance uniformity of the light guide plates at different tunnel heights were measured through the following method. The results are shown in Table 1 below.

With respect to the light guide plates manufactured in the examples and comparative examples, the luminance and luminance uniformity of the light guide plates at different gaps between tunnels were measured through the following method. The results are shown in Table 2 below.

With respect to the light guide plates manufactured in the examples and comparative examples, the luminance and luminance uniformity of the light guide plates at different pattern sizes on the bottom of the tunnels were measured through the following method. The results are shown in Table 3 below.

(1) Measurement of luminance

Luminance was measured at the center of BLU using a luminance meter (BM-7, available from TOPCON, Japan).

(2) Measurement of luminance uniformity

Luminance was measured at a total of 25 positions including five positions of each of upper and lower portions relative to the center of BLU using a luminance meter (BM-7, available from TOPCON, Japan). The measured 25 values were represented by a minimum luminance/a maximum luminance to determine the uniformity.

TABLE 1

| | Light Guide Plate | | Tunnels | | | | | | |
|---|---|---|---|---|---|---|---|---|---|
| | | | Gap between | | | Pattern | | | |
| | Height (mm) | Length (mm) | tunnels (mm) | Height (mm) | Length (mm) | Shape | Size (μm) | Luminance | Luminance Uniformity |
| Ex. 1 | 2 | 1200 | 3 | 1.2 | 1200 | hemisphere | 200 | 4250 | 1.39 |
| Ex. 2 | 2 | 1200 | 3 | 1.3 | 1200 | hemisphere | 200 | 4275 | 1.39 |
| Ex. 3 | 2 | 1200 | 3 | 1.5 | 1200 | hemisphere | 200 | 4325 | 1.39 |
| Ex. 4 | 4 | 1200 | 3 | 2.0 | 1200 | hemisphere | 200 | 4401 | 1.39 |
| Ex. 5 | 4 | 1200 | 3 | 3.0 | 1200 | hemisphere | 200 | 4438 | 1.39 |
| C. Ex. 1 | 7.2 | 1200 | 3 | 3.5 | 1200 | hemisphere | 200 | 4523 | 1.39 |
| C. Ex. 2 | 8.2 | 1200 | 3 | 4.0 | 1200 | hemisphere | 200 | 4538 | 1.39 |
| C. Ex. 3 | 8.5 | 1200 | 3 | 4.2 | 1200 | hemisphere | 200 | 4624 | 1.39 |
| C. Ex. 4 | 9.2 | 1200 | 3 | 4.5 | 1200 | hemisphere | 200 | 4657 | 1.39 |
| C. Ex. 5 | 10.2 | 1200 | 3 | 5.0 | 1200 | hemisphere | 200 | 4722 | 1.39 |

TABLE 2

| | Light Guide Plate | | Tunnels | | | Pattern | | | |
|---|---|---|---|---|---|---|---|---|---|
| | Height (mm) | Length (mm) | Gap between tunnels (mm) | Height (mm) | Length (mm) | Shape | Size (μm) | Luminance | Luminance Uniformity |
| Ex. 6 | 4 | 1200 | 3 | 3 | 1200 | hemisphere | 200 | 4438 | 1.39 |
| Ex. 7 | 4 | 1200 | 5 | 3 | 1200 | hemisphere | 200 | 4321 | 1.40 |
| Ex. 8 | 4 | 1200 | 8 | 3 | 1200 | hemisphere | 200 | 4315 | 1.40 |
| Ex. 9 | 4 | 1200 | 12 | 3 | 1200 | hemisphere | 200 | 4289 | 1.41 |
| Ex. 10 | 4 | 1200 | 15 | 3 | 1200 | Hemisphere | 200 | 4155 | 1.41 |
| C. Ex. 6 | 4 | 1200 | 20 | 3 | 1200 | Hemisphere | 200 | 4105 | 1.42 |
| C. Ex. 7 | 4 | 1200 | 25 | 3 | 1200 | Hemisphere | 200 | 4025 | 1.45 |
| C. Ex. 8 | 4 | 1200 | 30 | 3 | 1200 | Hemisphere | 200 | 4012 | 1.52 |
| C. Ex. 9 | 4 | 1200 | 40 | 3 | 1200 | Hemisphere | 200 | 3865 | 1.57 |
| C. Ex. 10 | 4 | 1200 | 45 | 3 | 1200 | hemisphere | 200 | 3820 | 1.58 |

TABLE 3

| | Light Guide Plate | | Tunnels | | | Pattern | | | |
|---|---|---|---|---|---|---|---|---|---|
| | Height (mm) | Length (mm) | Gap between tunnels (mm) | Height (mm) | Length (mm) | Shape | Size (μm) | Luminance | Luminance Uniformity |
| Ex. 11 | 4 | 1200 | 5 | 3 | 1200 | Hemisphere | 50 | 4738 | 1.28 |
| Ex. 12 | 4 | 1200 | 5 | 3 | 1200 | Hemisphere | 60 | 4652 | 1.30 |
| Ex. 13 | 4 | 1200 | 5 | 3 | 1200 | Hemisphere | 120 | 4605 | 1.32 |
| Ex. 14 | 4 | 1200 | 5 | 3 | 1200 | Hemisphere | 150 | 4577 | 1.35 |
| Ex. 15 | 4 | 1200 | 5 | 3 | 1200 | Hemisphere | 300 | 4532 | 1.39 |
| C. Ex. 11 | 4 | 1200 | 5 | 3 | 1200 | Hemisphere | 320 | 4325 | 1.39 |
| C. Ex. 12 | 4 | 1200 | 5 | 3 | 1200 | Hemisphere | 350 | 4301 | 1.40 |
| C. Ex. 13 | 4 | 1200 | 5 | 3 | 1200 | Hemisphere | 400 | 4278 | 1.41 |
| C. Ex. 14 | 4 | 1200 | 5 | 3 | 1200 | Hemisphere | 450 | 4254 | 1.41 |
| C. Ex. 15 | 4 | 1200 | 5 | 3 | 1200 | Hemisphere | 500 | 4182 | 1.42 |

As is apparent from Table 1, according to the results of optical measurement, in the case where the height of the tunnels falls out of 50~90% of the height of the light guide plate, luminance uniformity is uniformly maintained and luminance is increased. However, if the light guide plate is formed too thick, problems may be undesirably caused when such a light guide plate is combined with other backlight members.

Also, as is apparent from Table 2, in the case where the gap between tunnels is proportionately increased by an increment of luminance of Table 1, luminance uniformity and luminance may undesirably become inferior due to the lack of quantity of light in proportion to an increase in the gap between lamps.

Also, as is apparent from Table 3, in the case where the pattern of the bottom, that is, the diameter of the hemisphere is changed, luminance and luminance uniformity are increased in proportion to a decrease in the diameter.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A light guide plate having tunnels formed to allow insertion of a light source in a lateral direction,
wherein the light guide plate includes (a) a tunnel region having tunnels to receive the light source and (b) a tunnel-free region having no tunnels,
wherein the tunnels are spaced apart from each other;
wherein a fine pattern is formed on a bottom of the light guide plate; and
wherein the fine pattern is of a hemisphere shape which has a size of 20-300 μm.

2. The light guide plate of claim 1, wherein widths of the tunnel region and the tunnel-free region are 40-70% and 30-60%, respectively, of an entire width of the light guide plate.

3. The light guide plate of claim 1, wherein a height of the tunnels is 50-90% of a height of the light guide plate.

4. The light guide plate of claim 1, wherein the tunnels are spaced apart from each other at a distance of 3-20 mm.

5. A method of manufacturing a light guide plate, comprising
separately extruding a planar lower panel and an upper panel having tunnels, and
combining an upper surface of the lower panel with a lower surface of the upper panel to give the light guide plate,
wherein the tunnels are spaced apart from each other;
wherein a fine pattern is formed on the upper surface of the lower panel; and
wherein the fine pattern is the hemisphere which has a size of 20-300 μm.

6. A light guide structure having tunnels formed to allow insertion of a light source in a lateral direction, said light guide device having a width, a length, and a height, and the tunnels being formed along the length of the device inside the device,
    wherein the light guide structure includes (a) a tunnel region having the tunnels and (b) a tunnel-free region having no tunnels,
    wherein the tunnels are spaced apart from each other;
    wherein the entire inner surface of the bottom of the light guide structure is provided with a fine pattern; and
    wherein the fine pattern has a hemisphere shape which has a size of 20-300 μm.

* * * * *